United States Patent [19]

Seki

[11] Patent Number: 5,047,941
[45] Date of Patent: Sep. 10, 1991

[54] WHEEL ACCELERATION SLIP CONTROL DEVICE

[75] Inventor: Hirokazu Seki, Saitama, Japan

[73] Assignees: Akebono Brake Industry Co. Ltd., Tokyo; Akebono Research and Development Centre Ltd., Hanyu, both of Japan

[21] Appl. No.: 617,389

[22] Filed: Nov. 20, 1990

Related U.S. Application Data

[63] Continuation of Ser. No. 201,402, Jun. 2, 1988, abandoned.

[30] Foreign Application Priority Data

Jun. 4, 1987 [JP] Japan .................. 62-138994

[51] Int. Cl.$^5$ ........................... B60K 31/00
[52] U.S. Cl. ............ 364/426.03; 364/426.01; 180/197; 303/97
[58] Field of Search .......... 364/426.03, 426.01; 180/197; 363/97, 100, 108, 109

[56] References Cited

U.S. PATENT DOCUMENTS

| | | | |
|---|---|---|---|
| 4,681,374 | 7/1987 | Nakamura et al. | 180/197 |
| 4,733,760 | 3/1988 | Inagaki et al. | 180/197 |
| 4,736,814 | 4/1988 | Yogo et al. | 180/197 |
| 4,739,856 | 4/1988 | Inagaki et al. | 364/426.03 |
| 4,763,262 | 8/1988 | Leiber | 364/426.03 |
| 4,771,848 | 9/1988 | Namba et al. | 180/197 |
| 4,778,025 | 10/1988 | Sakaguchi et al. | 180/197 |
| 4,788,644 | 11/1988 | Inagaki | 364/426.03 |
| 4,811,808 | 3/1989 | Matsumoto et al. | 180/197 |

FOREIGN PATENT DOCUMENTS 0182020 9/1985 Japan .
0168122 12/1985 Japan .
2129975 10/1983 United Kingdom .
2139757 10/1983 United Kingdom .

Primary Examiner—Parshotam S. Lall
Assistant Examiner—V. N. Trans
Attorney, Agent, or Firm—Cushman, Darby & Cushman

[57] ABSTRACT

A wheel acceleration slip control device for a vehicle, such as an automobile, in which the degree of opening of the throttle is controlled according to the difference between a driven wheel corresponding speed or driven wheel speed and each of a first and a second threshold values which are determined with respect to a vehicle speed. Control maintains the degree of the degree of opening of the throttle when the driven wheel corresponding speed or driven wheel speed is between the first and second threshold values, whereby excessively large variations of engine torque are prevented, the engine speed can be stably increased, and the vehicle can be smoothly accelerated.

5 Claims, 3 Drawing Sheets

WHEEL ACCELERATION SLIP CONTROL DEVICE

This is a continuation of application Ser. No. 201,402, filed on June 2, 1988, which was abandoned.

BACKGROUND OF THE INVENTION

The present invention relates to a wheel acceleration slip control device which, during the start acceleration of a vehicle such as an automobile, controls the engine torque to prevent the driving wheels from slipping.

With a conventional wheel slip control device of engine torque control type which, during the wheel acceleration, operates to close the engine's throttle when the driving wheel speed is higher than, a predetermined threshold value, and to open the throttle when the driving wheel speed is lower than the threshold value, the engine speed increases or decreases until the control operation is accomplished.

However, if the engine speed is varied in such a manner, it will make the vehicle uncomfortable to ride in, and it will make it difficult to quickly eliminate the acceleration slip of driving wheels.

SUMMARY OF THE INVENTION

Accordingly, an object of the present invention is to provide a wheel acceleration slip control device which eliminates the excessively large variation of the engine speed and allows smooth acceleration of the vehicle.

The foregoing object and other objects of the invention have been achieved by providing a wheel acceleration slip control device comprising: threshold values setting means for setting a first threshold value and a second threshold value larger than the first threshold value, respectively, with a vehicle body speed as a reference; driven wheel corresponding speed calculating means for calculating a driven wheel corresponding speed in accordance with an engine speed (or an output of a revolution sensor provided for a driven wheel); and control instruction means for performing control of a throttle within a degree of opening specified by the operator according to the difference between the driven wheel corresponding speed (or driven wheel speed) thus calculated and each of the first and second threshold values; in which, according to the invention, when the driven wheel corresponding speed (or driven wheel speed) is between the first and second threshold values, the control instruction means operates to hold the degree of opening of the throttle as it is.

The nature, principle and utility of the invention will become more apparent from the following detailed description when read in conjunction with the accompanying drawings.

DETAILED DESCRIPTION OF THE INVENTION

An embodiment of a wheel acceleration slip control device according to the present invention will be described with reference to the accompanying drawings.

Figure 1:
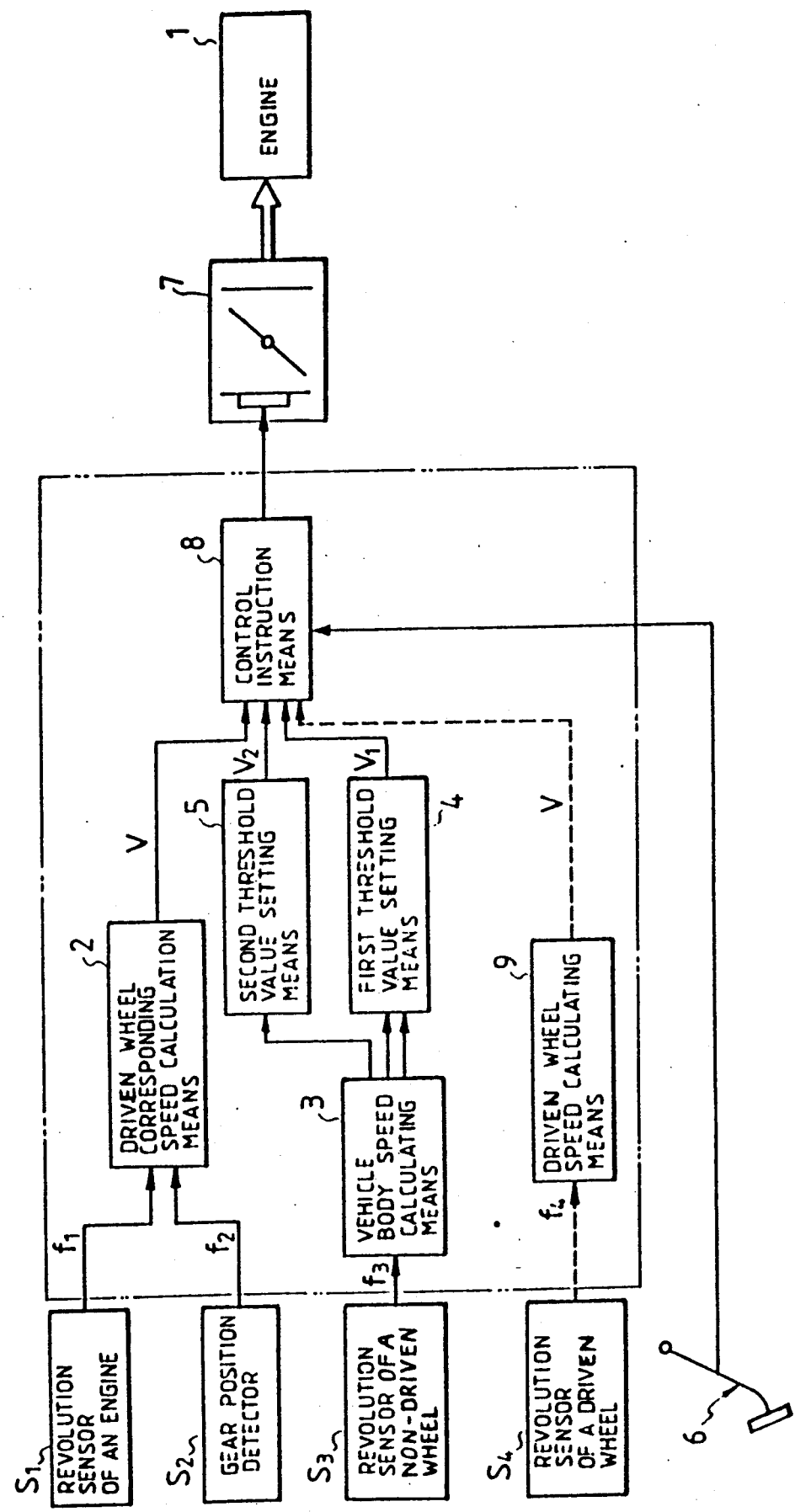
FIG. 1 is a block diagram showing the arrangement of an embodiment of a wheel acceleration slip control device according to the present invention.

In the wheel acceleration slip control device, as shown in FIG. 1, a revolution sensor $S_1$ detects the speed (r.p.m.) of an engine 1 and generates an output signal $f_1$, while a gear position detector $S_2$ detects the gear position of the transmission of the vehicle at that time, and generates an output signal $f_2$. These output signals $f_1$ and $f_2$ are applied to a driven wheel corresponding speed calculation means 2, which calculates a driven wheel corresponding speed V from the signals $f_1$ and $f_2$.

Another revolution sensor $S_3$ detects the speed of a non-driven wheel and generates an output signal $f_3$, which is applied to a vehicle body speed calculating means 3. The means 3 calculates a vehicle body speed $V_T$ from the output signal $f_3$ representing the speed of the non-driven wheel.

With the vehicle body speed $V_T$ as a reference value, a first threshold value $V_1$ and a second threshold value $V_2$ (higher than $V_1$) for slip control are set by first and second threshold value setting means 4 and 5, respectively.

$$V_1 = V_T + \Delta V_1 \qquad V_2 = V_T + \Delta V_2$$

where $\Delta V_2 > \Delta V_1$

The degree of opening of a throttle 7 is controlled according to the movement of the accelerator pedal 6.

On the other hand, control instruction means 8 provides a control instruction for increasing, decreasing, or maintaining the degree of opening of the throttle 7 by comparing the driving wheel corresponding speed V with each of the first threshold value $V_1$ and the second threshold value $V_2$. This will be described in more detail with reference to FIG. 2.

Figure 2:
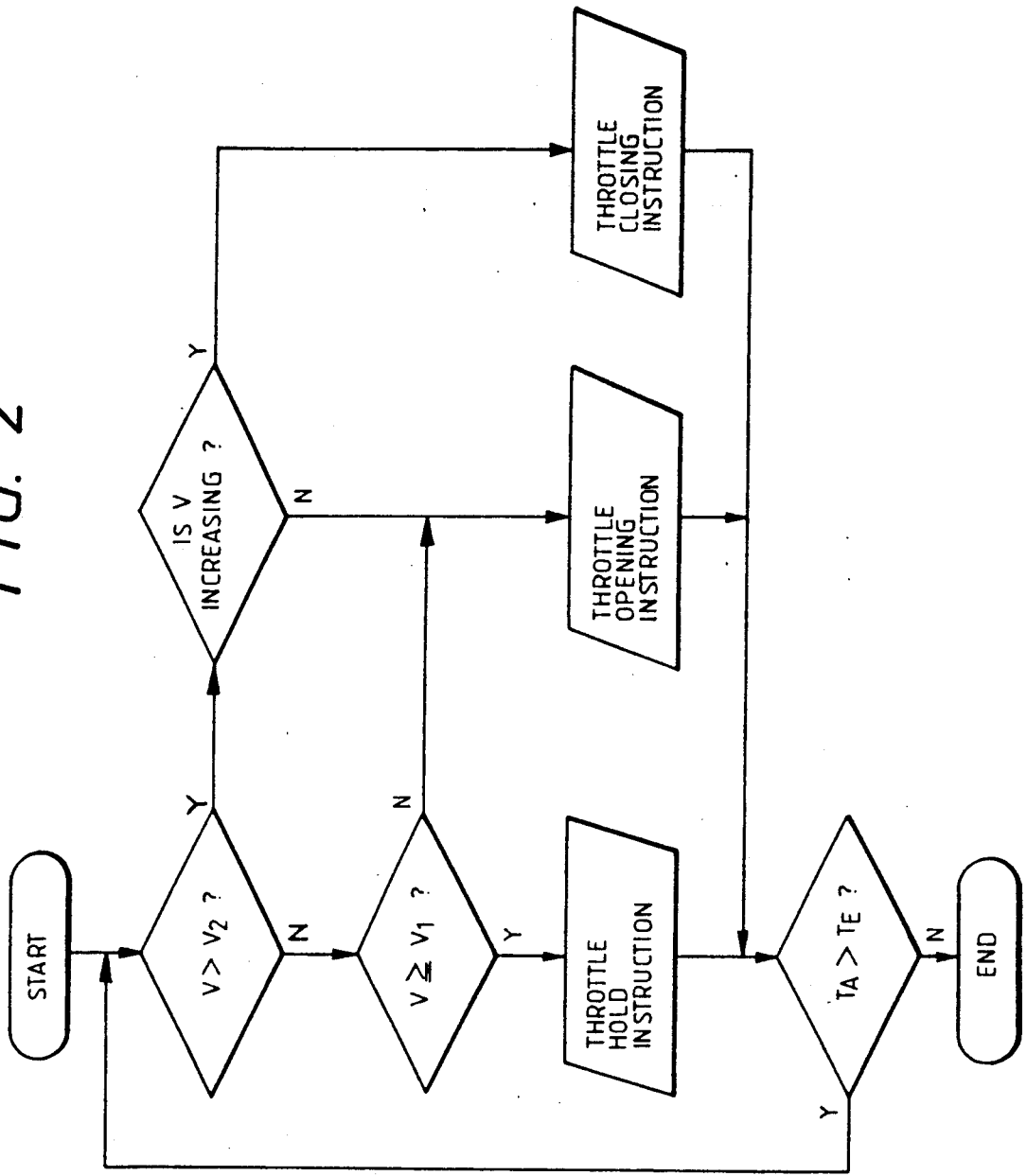
FIG. 2 is a flow chart for a description of the operation of the control device according to the invention.

As shown in the flow chart of FIG. 2, when, in the start of the vehicle, the driven wheel corresponding speed V exceeds the second threshold value $V_2$ and is increasing, a throttle closing instruction is applied. When the driven wheel corresponding speed has reached its high peak C (FIG. 3) and is decreasing, a throttle opening instruction is applied.

When the driven wheel corresponding speed V is smaller than the second threshold value $V_2$ and is equal to or larger than the first threshold value $V_1$, the control instruction means 8 provides a throttle hold instruction to maintain the degree of opening of the throttle 7 as it is. When the driven wheel corresponding speed V is lower than the first threshold value $V_1$, the control instruction means 8 outputs the throttle opening instruction.

In FIG. 2, reference character $T_A$ designates the degree of opening of the throttle given by the accelerator pedal, and $T_E$, the actual degree of opening of the throttle. When $T_A$ becomes smaller than $T_E$, the control is suspended.

The control operation will be described with reference to FIG. 3, a control characteristic diagram.

When, in the start of the vehicle, with the degree of opening of throttle (hereinafter referred to as "a throttle opening degree", when applicable) $T_A$ specified by the operation of pushing the accelerator pedal 6, the slip is increased, and the driven wheel corresponding speed V is increased to reach the first threshold value $V_1$ (the point a), the control instruction means 8 starts its operation.

Figure 3:
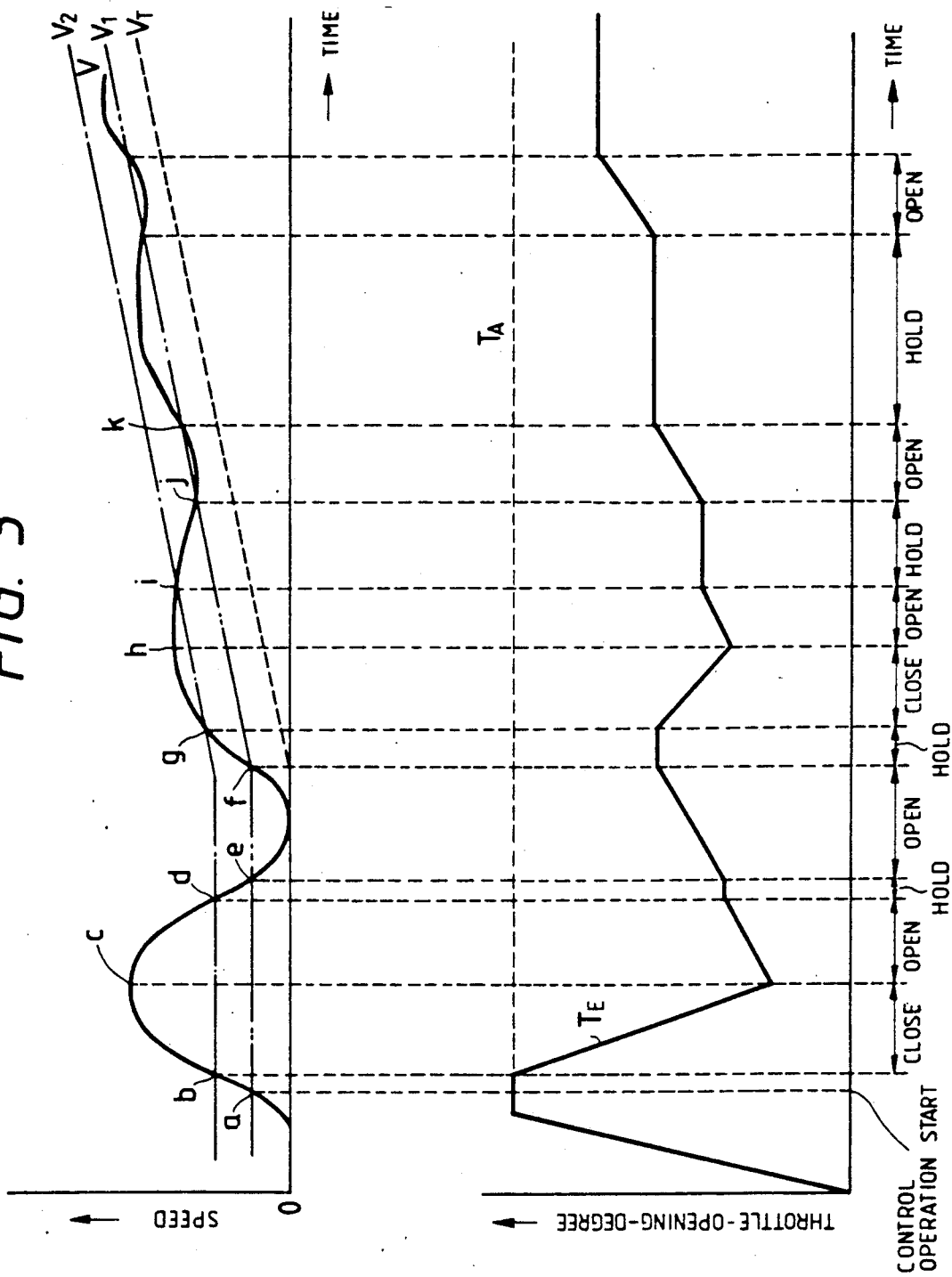
FIG. 3 is a graphical representation for a description of the operation with time of the control device according to the invention.

When the driven corresponding speed V reaches the second threshold value $V_2$ and is increasing (the point b), the control instruction means 8 provides the throttle closing instruction, so that the degree of opening is decreased quickly as shown in the lower part of FIG. 3.

As a result, the slip of the driving wheel tends to decrease. When the driven wheel corresponding speed V reaches the high peak and is then decreasing (the point c), the control instruction means 8 outputs the throttle opening instruction to increase the degree of opening. When the driven wheel corresponding speed V reaches the second threshold value $V_2$ and is decreasing (point d), the control instruction means 8 outputs the instruction for suspending the operation of opening the throttle 7, to hold the degree of opening of the throttle 7.

When the driven wheel control speed V reaches the first threshold value $V_1$, and is decreasing (the point e), the control instruction means 8 provides the throttle opening instruction.

When the driven wheel corresponding speed V, after reaching its low peak, is increased to the first threshold value $V_1$ again (the point f), the control instruction means 8 outputs the instruction for suspending the operation of opening the throttle 7 to hold the degree of opening thereof.

When, the driving wheel's slip is increasing and the driving wheel corresponding speed V reaches the second threshold value $V_2$ (the point g), the throttle closing instruction is generated. When the driven wheel corresponding speed V reaches a high peak (the point h), and is decreasing, the instruction of increasing the degree of opening of the throttle 7 is outputted.

When the slip of the driven wheel is decreasing and the driven wheel corresponding speed V is decreased in variation to reach the second threshold value $V_2$ (the point i), the throttle-opening-degree increasing instruction is eliminated, so that the degree of opening is held as it is.

When the driven wheel corresponding speed decreases to the first threshold value $V_1$ and is decreasing (the point j), the instruction for increasing the degree of opening of the throttle is outputted. When the driven wheel corresponding speed V is increased to reach the first threshold value $V_1$ (the point k), the application of the throttle-opening-degree increasing instruction is suspended, so that the throttle opening degree is held as it is.

The above-described control operations are repeatedly carried out until the actual degree of opening $T_E$ of the throttle 7 is coincided with the throttle opening degree $T_A$ specified with the accelerator pedal 6. Thus, the control has been accomplished.

In the above-described embodiment, the driven wheel corresponding speed V is employed. However, instead of the driven wheel corresponding speed, an actual driven wheel speed may be used. In this case, the speed of the driven wheel is measured with another revolution sensor $S_4$, and a driving wheel speed V is calculated by driven wheel speed calculating means 9 from the output signal $f_4$ of the revolution sensor $S_4$, so that the control is carried out according to the comparison of the output signal of the calculating means 9 with the above-described first and second threshold values $V_1$ and $V_2$.

When the speed is in the range between the first threshold value $V_1$ and the second threshold value $V_2$; i.e., the acceleration is stable, the degree of opening of the throttle is maintained unchanged, and therefore, the engine torque will not change excessively; that is, the accelerating operation is carried out stably.

In FIG. 1, the various means encircled with the two-dot chaining line can be realized by using a microcomputer.

As was described above, in the wheel acceleration slip control device of the invention, when the driven wheel corresponding speed (or driven wheel speed) V changes with respect to the first threshold value $V_1$ or the second threshold value $V_2$, the degree of opening of the throttle 7 is decreased or increased in response to the instruction from the control instruction means 8 for the suitable control of the engine torque, so that the start acceleration less in slip is achieved. And the control instruction means 8 is so designed that, when the driven wheel corresponding speed (or driven wheel speed) V is between the first and second threshold values $V_1$ and $V_2$ while being increased; i.e., the stable acceleration is effected with the speed V in the range between $V_1$ and $V_2$, the degree of opening of the throttle 7 is held as it is. Therefore, the throttle opening degree being held constant, the engine torque will not change excessively, and the driven wheel acceleration slip is prevented.

What is claimed is:

1. A wheel acceleration slip control device comprising:
    threshold value setting means for setting a first threshold value above a vehicle body speed and a second threshold value above said vehicle body speed larger than said first threshold value;
    driven wheel corresponding speed calculating means for calculating a driven wheel corresponding speed from an engine speed; and
    control instruction means for controlling a throttle within a degree of opening specified for said throttle by an operator to (1) close the degree of opening of said throttle when said driven wheel corresponding speed is greater than said second threshold value and increasing, (2) open the degree of opening of said throttle when said driven wheel corresponding speed is (a) greater than said second threshold value and decreasing and (b) less than said first threshold value, and (3) hold the degree of opening of said throttle when said driven wheel corresponding speed is between said first threshold value and said second threshold value.

2. The device of claim 1, wherein said threshold value setting means, said driven wheel corresponding speed calculating means and said control instruction means consist of a microcomputer.

3. The device of claim 1, further comprising:
    engine speed sensing means for sensing said engine speed; and
    gear position detecting means for detecting a position of a gear of the vehicle,
    wherein said driven wheel corresponding speed calculating means outputs said driven wheel corresponding speed in accordance with outputs of said engine speed sensing means and said gear position detecting means.

4. A wheel acceleration slip control device comprising:
threshold value setting means for setting a first threshold value and a second threshold value larger than said first threshold value, respectively, according to a vehicle body speed;
driven wheel speed calculating means for calculating a driven wheel speed from an output signal or a revolution sensor provided for a driven wheel; and
control instruction means for controlling a throttle within a degree of opening specified for said throttle by an operator to (1) close the degree of opening of said throttle when said driven wheel speed is greater than said second threshold value and increasing, (2) open the degree of the opening of said throttle when said driven wheel speed is (a) greater than said second threshold value and decreasing and (b) less than said first threshold value, and (3) hold the degree of opening of said throttle when said driven wheel speed is between said first threshold value and said second threshold value.

5. The device of claim 4, wherein said threshold value setting means, said driven wheel speed calculating means and said control instruction means consist of a microcomputer.

* * * * *